Feb. 13, 1951  H. H. FELDSTEIN ET AL  2,541,753
PAGE CARD FILE PROCESSING APPARATUS
Filed Jan. 21, 1948  5 Sheets-Sheet 2

INVENTOR.
HENRY H. FELDSTEIN &
MARC J. FELDSTEIN
BY
West & Oldham
Attorneys

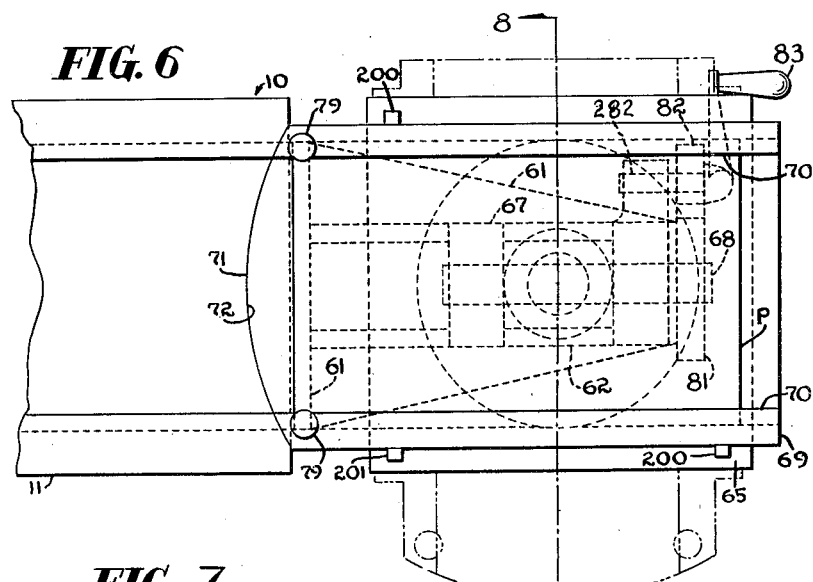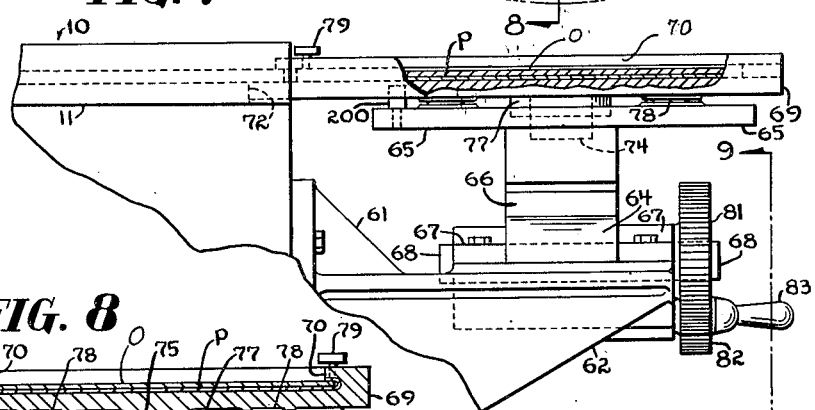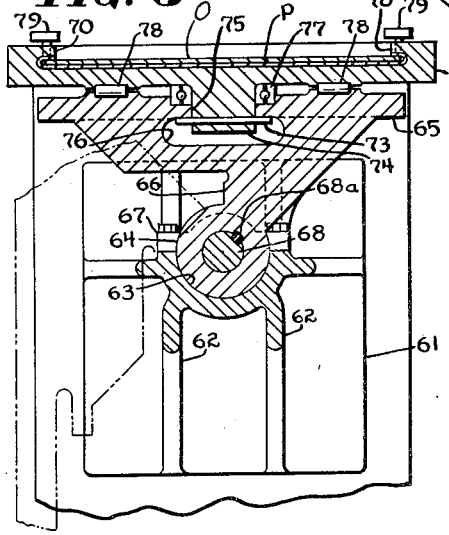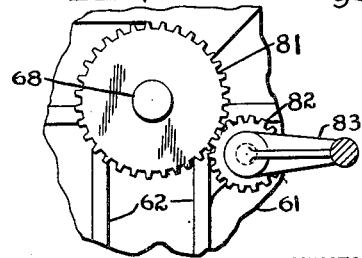

Feb. 13, 1951  H. H. FELDSTEIN ET AL  2,541,753
PAGE CARD FILE PROCESSING APPARATUS
Filed Jan. 21, 1948  5 Sheets-Sheet 4
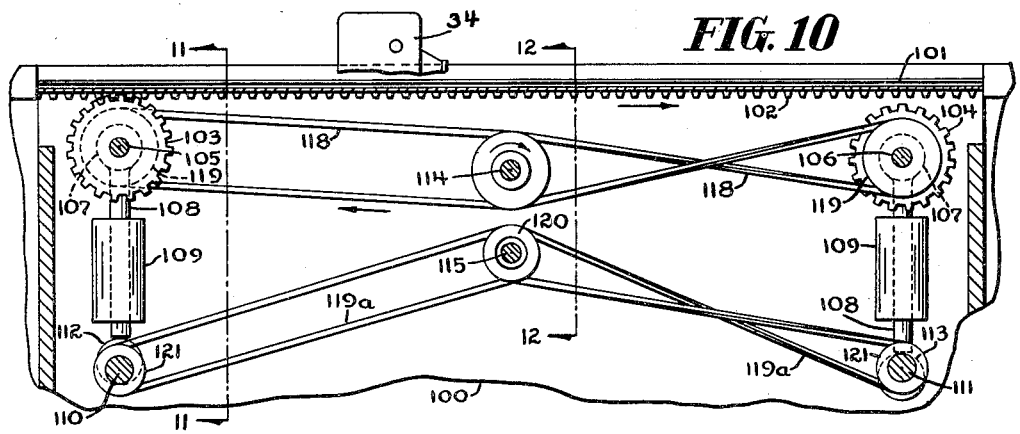
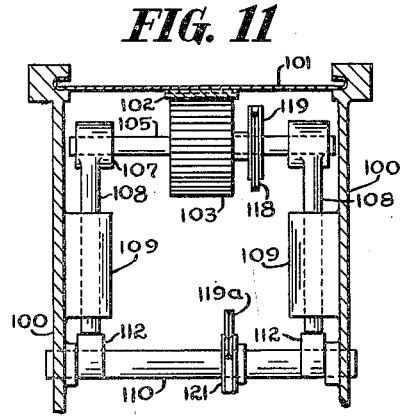
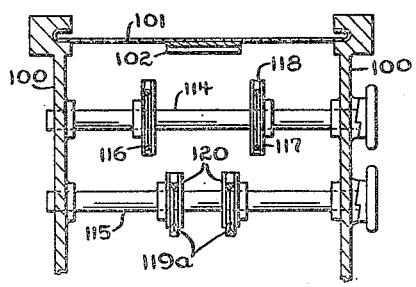
INVENTOR.
HENRY H. FELDSTEIN &
MARC J. FELDSTEIN
BY
ATTORNEYS Feb. 13, 1951     H. H. FELDSTEIN ET AL     2,541,753
PAGE CARD FILE PROCESSING APPARATUS
Filed Jan. 21, 1948     5 Sheets-Sheet 5
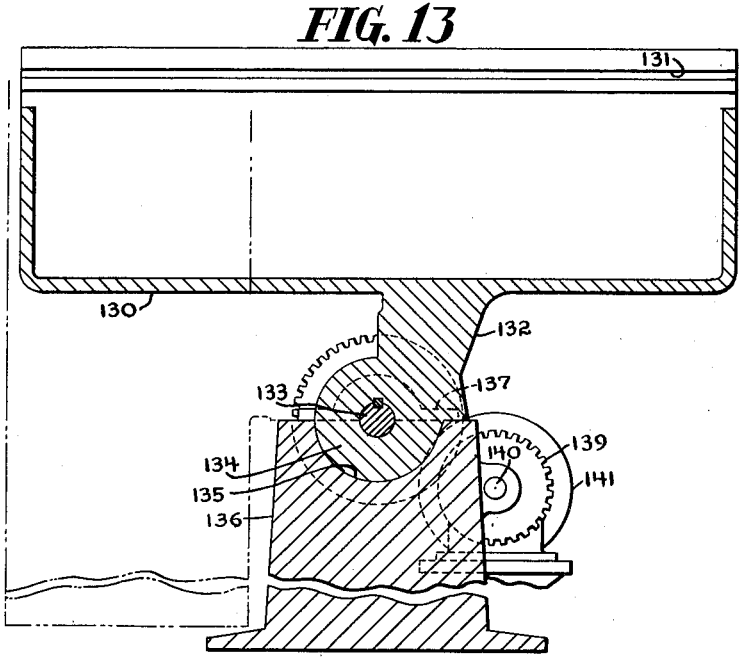
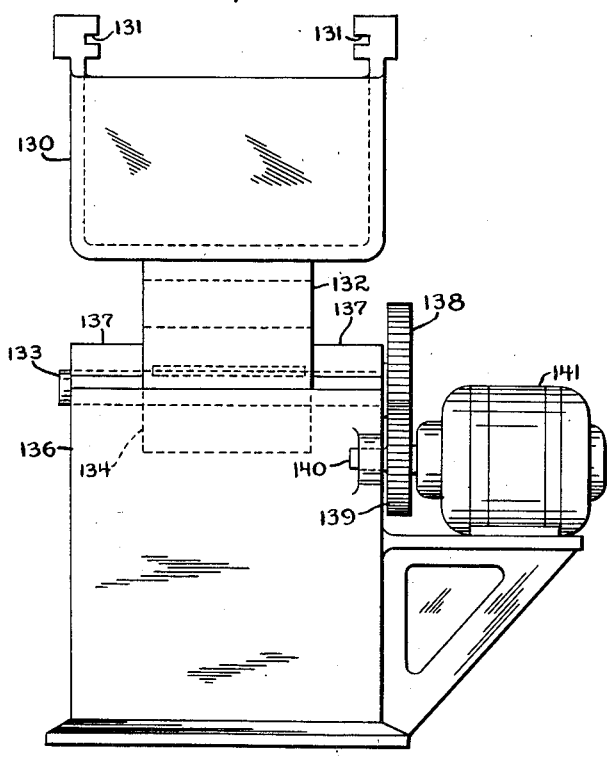
INVENTOR.
HENRY H. FELDSTEIN &
MARC J. FELDSTEIN
BY
Attorneys Patented Feb. 13, 1951

2,541,753

UNITED STATES PATENT OFFICE 2,541,753

PAGE CARD FILE PROCESSING APPARATUS

Henry H. Feldstein, Cleveland, Ohio, and
Marc J. Feldstein, Arlington, Va.

Application January 21, 1948, Serial No. 3,638

24 Claims. (Cl. 40—64)

This invention relates to page card files, especially to apparatus for facilitating changes in arrangement of data-bearing cards slidably received in and extending transversely of page card files, and for photographing the cards.

Many page card files are in use today and these files may be of various constructions and sometimes may be in the form of a plurality of separate files which are adapted, usually, to be secured together in end-to-end relationship in any conventional manner whereby positive engagement between the abutted ends of two page card files can be secured. In other instances, page card files may be made from relatively flexible material in elongate strip form so that such a page card file can be coiled on itself in roll form. The page card files, in all events, normally include the relatively wide base portion that has inwardly turned flanges formed along its lateral margins, which flanges are spaced slightly from the base of the base card file and are adapted to receive, for sliding engagement, transversely extending data-bearing cards or strips. These data-bearing cards are loosely carried by the page card file to facilitate changing the cards, or inserting new cards, withdrawing old cards, etc. so that the data carried by the page card file can be maintained on a current basis with changing business conditions.

The general object of this invention is to provide an improved, novel apparatus of the class described which is inexpensive but sturdily constructed.

Another object of the invention is to provide an uncomplicated positive engagement between the plow frame member and the rest of the apparatus.

A further object of the invention is to prevent data-bearing cards carried by a page card file from piling up on each other in superimposed relation when the data-bearing cards are being shifted to new positions to add or remove data-bearing cards and when the old data-bearing cards may be temporarily displaced from their normal engagement with the apparatus of the invention.

A further object of the invention is to provide a drive for moving page card files in either direction, when engaged with the apparatus of the invention.

Yet another object of the invention is to provide low friction positioning means for page card files to facilitate endwise movement of same through the apparatus of the invention.

Another object of the invention is to provide apparatus for processing page card files so as to facilitate movement of data-bearing strips carried thereby.

Still another object of the invention is to provide apparatus of the class desribed wherein all or part of the apparatus is adapted to be tilted to a vertical position to facilitate photographing a page card file and the contents thereof.

Another object of the invention is to provide disengageable drive means having positive engagement with a page card file for controlling its longitudinal movement through a positioning frame.

Yet another object of the invention is to position a page card file by means engaged with opposed edge portions thereof and to move such file longitudinally through the positioning means by separate means associated with the center portion of the file.

Attention is directed to the accompanying drawings wherein:

Fig. 1 is an elevation, partially broken away and shown in section, of the apparatus embodying the principles of the invention;

Figs. 2, 3 and 4 are transverse sections taken on the line 2—2, 3—3 and 4—4 of Fig. 1;

Fig. 6 is a plan of a page card file support bracket at one end of the apparatus shown in Fig. 1;

Fig. 7 is a side elevation, partially in section, of the means shown in Fig. 6;

Fig. 8 is a vertical section taken on line 8—8 of Fig. 6;

Fig. 9 is a partial vertical section taken on line 9—9 of Fig. 7;

Fig. 10 is a fragmentary vertical section partially shown in diagram of a modified type of apparatus of the invention;

Figure 1:
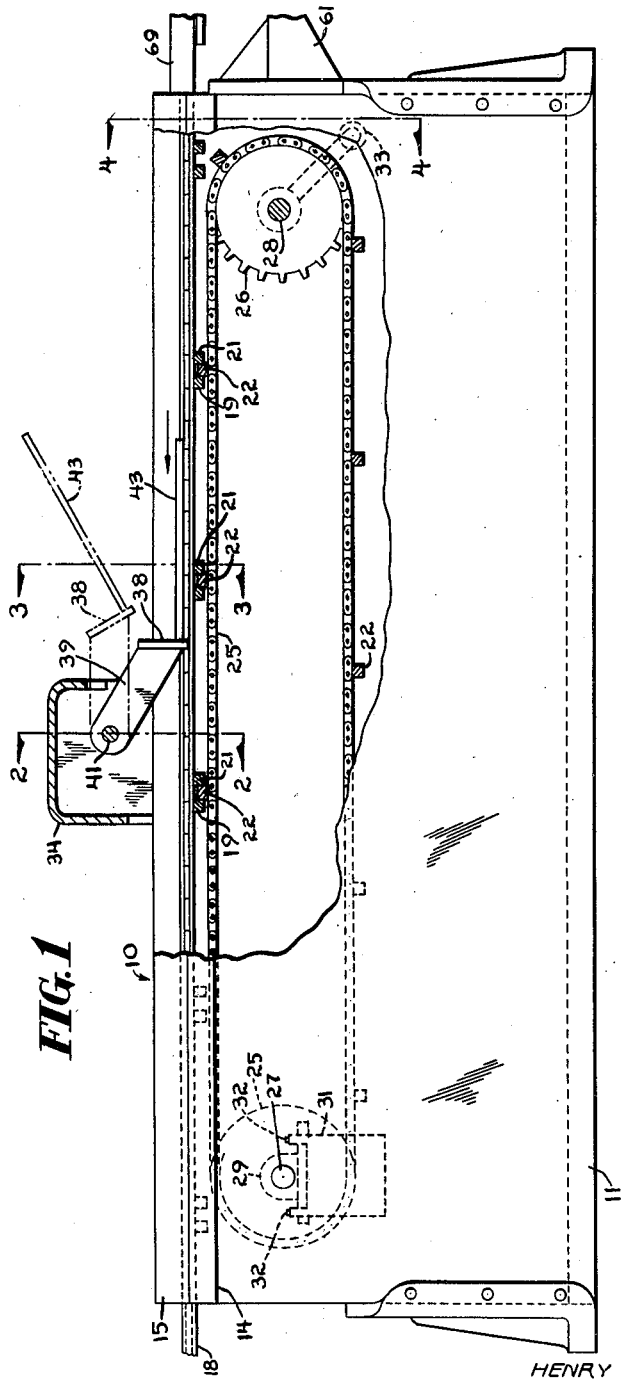
Figure 2:
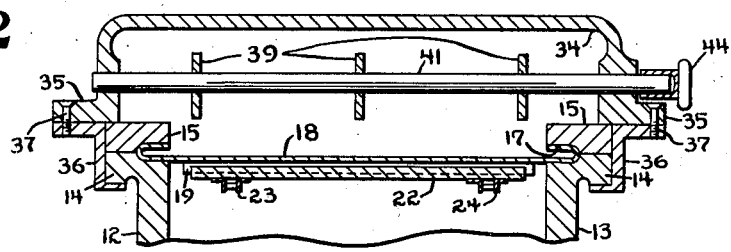

Figs. 11 and 12 are vertical sections taken on lines 11—11 and 12—12 of Fig. 10;

Fig. 13 is a vertical section, partially diagrammatic, of a further modification of the apparatus; and Fig. 14 is an end elevation of the apparatus shown in Fig. 13.

Reference is now made to the details of the construction shown in the accompanying drawings wherein the numeral 10 generally indicates apparatus for facilitating the positioning of data-bearing strips in a page card file. A frame 11 is provided which includes side members 12 and 13 which extend longitudinally of the frame in spaced relation and have a longitudinally open center portion of the apparatus defined therebetween. Each of the side members 12 and 13 are shown as being provided with an integral outwardly extending flange 14 which extends the length thereof for a purpose to be hereinafter explained. Both of the side members 12 and 13 carry cover bars or strips 15 which are removably secured thereto in any conventional manner, as by screws 16 which engage with the flanges 14. The cover bars 15 and the upper portions of the side members 12 and 13 are formed with complementary grooves therein which combine to form a recess 17 on the inner surface of each of the side member assemblies. These recesses 17 are in opposed relation on the longitudinal open center portion of the frame. As a feature of the invention, the recesses 17 are of such size and shape as to receive a page card file 18 therein for longitudinal movement through the frame 11 in either direction. The page card file 18 is longitudinally threaded into engagement between the recesses 17 and, of course, extends therebetween and is supported thereby for sliding movement along the frame 11. The page card file 18 has pairs of transversely extending, downwardly projecting lugs 19 and 21 formed thereon at the spaced longitudinal portions thereof. These pairs of lugs 19 and 21 are adapted to receive therebetween a similar lug or bar 22 which is associated with drive means provided for moving the page card file through the apparatus. Other lug driving engagement may be provided in place of the construction shown and may comprise spaced lugs on the drive belt that individually engage with one or two lugs on the page card file for moving same forwardly and rearwardly. These lugs 22 extend transversely of the frame 11 and are positioned by endless drive means, such as endless chains 23 and 24 which are suitably secured to the lugs 22 adjacent each end thereof. The chains 23 and 24 engage with sprockets 25 and 26 which are journaled in the frame 11 on shafts 27 and 28 so that the drive unit formed therefrom can move the page card file in either desired longitudinal direction. Preferably the shaft 27 is carried in a housing 29 which is slidably associated with a support 31 and is retained in a given position by means of set screws 32 whereby the longitudinal position of the sprocket 25 can be varied for maintaining the drive means of the invention taut. Any conventional drive means can be provided for the drive unit formed of the lugs 22 and chains 23 and 24, and a crank arm 33 is shown engaged with an outer end of the shaft 28 so that the position of the page card file 18 can be manually controlled as it is moved through the apparatus 10.

Figure 3:
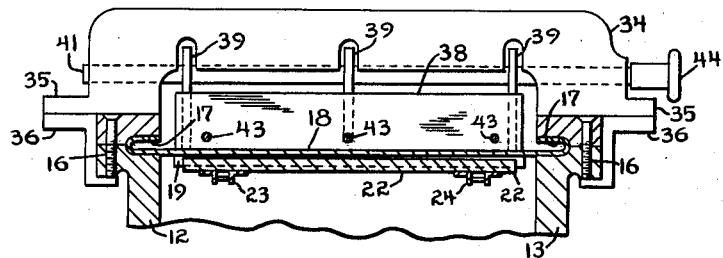
Figure 4:
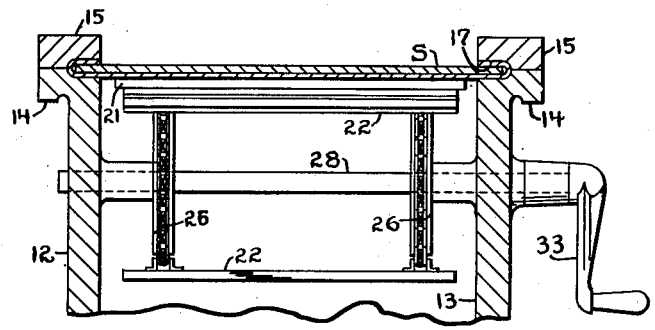

Another salient feature of the invention is that the position of the data-bearing cards in the apparatus can be controlled as relative movement between such cards and the page card file occurs to reset the cards in the file. Thus, a plow frame 34 is provided and extends transversely of the frame 11, being carried on the cover bars 15 which function as ways therefor. The plow frame 34 is wider than the frame 11 and has laterally outwardly directed base portions, or flanges 35, which normally but not necessarily project beyond the margins of the frame. Preferably the plow frame 34 is permanently retained in sliding engagement with the frame 11 so that substantially Z-shaped mounting brackets 36 are removably secured to the plow frame 34 by means of screws 37. These brackets 36 are adapted to extend inwardly of the frame 11 and engage with the lower surfaces of the flanges 14, as shown in Figs. 3 and 4. The actual plow device for engaging with and forming a stop for data-bearing strips carried in the page card file 18 in this instance comprises a bar 38 which extends transversely of the apparatus. The plow bar is supported by a plurality of bars 39 which are secured, as by welding to the back surface of the plow bar 38 and are carried on and secured to a shaft 41 that extends across the plow frame 34 and is journaled therein. The plow bar 38 is provided with a plurality of laterally spaced, longitudinally extending stabilizer or positioning fingers 43 that are adapted to overlie the page card file 18 and any data-bearing strips thereon when the plow bar 38 is brought down into engagement therewith. The shaft 41 positions the plow bar 38 for arcuate movement to and from a position bearing on the top of the page card file 18. A handle knob 44 is carried by the shaft 41 at one end thereof to control the position of the plow bar 38. The shaft 41 may be retained in a given position by friction, or any desired locking device may be associated therewith to retain it in a set position. In some instances, it may be desirable to form the stabilizer fingers 43 with slightly upwardly curved end portions so as to facilitate their engagement with data-bearing strips. In all events, the apparatus is adapted to be used by swinging the plow bar 38 into position wherein it presses on the data-bearing strips on the page card file and then the plow frame 34 and associated means are retained in a given position while the crank handle 33 is moved so as to occasion relative longitudinal movement of the page card file toward the front face of the plow bar 38 whereby the data-bearing strips being moved, if originally in spaced relation to each other, will accumulate in edge-to-edge abutting relationship underneath the positioning fingers 43.

Figure 5:
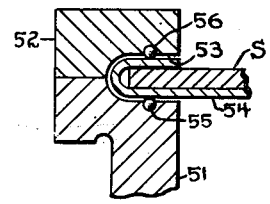
Fig. 5 is a fragmentary section of modified frame means of the invention.

As a modification of the invention, there is shown in Fig. 5 a frame side member 51 which has a cover bar 52 secured to the upper surface thereof in any desired manner. The cover bar 52 and frame 51 cooperate to form a recess 53 that is adapted to engage with the edge of a page card file 54. Longitudinal movement of a page card file 54 through the recess 53 is facilitated by the provision of suitable bearing means in the recess 53. These means are shown as comprising ball bearings 55 and 56 which are received in and suitably retained in surface portions of the side member 51 and cover bar 52 defining the recess 53.

It will be realized that in some instances it may be desirable to retain the page card file 18 in a stationary position and the plow frame 34 may be slid longitudinally of the page card file to effect re-positioning of data-bearing strips. In some instances initial relative movement between the data-bearing strips and the page card file may first move only one or two data-bearing strips which are to be brought into abutting relationship with other similar strips, or an abutted mass of strips may be moved as a body to a new position spaced longitudinally of the page card file. Figs. 4 and 5 best indicate a typical data-bearing strip S engaged with the page card file 18.

As best shown in Figs. 6 through 9, the apparatus of the invention is provided with an end portion adapted to receive a page card file unit from the main portion of the apparatus 10 and to position such page card file for arcuate movement in a horizontal plane to a position wherein the longitudinal axis of the page card file extends transversely of the apparatus and wherein the support bracket then can be tilted from a horizontal to a vertical position. The aforesaid portion of the apparatus is especially adapted for use when the contents of a page card file are desired to be photographed. Hence, any desired camera or other device is associated with the one end portion of the apparatus of the invention so that it can take a picture of the contents of the end bracket of the apparatus. Fig. 7 shows that a bracket 61 is secured to the frame 11 at one end thereof in any conventional manner and that the bracket 61 extends substantially longitudinally of the frame. The bracket 61 is provided with a pair of reinforcing ribs 62 that taper upwardly from the portion of the bracket 61 adjacent the frame 11, and such ribs aid in supporting a semicircular bearing 63 formed in the upper portion of the bracket 61. The bearing 63 journals therein a cylindrical support member 64 which is formed integrally with and on the lower surface of a support bracket 65. The support bracket 65 has a limiting shoulder 66 formed thereon for abutting on an upper surface of the bearing section 63 of the bracket 61 for limiting downward arcuate movement of the support bracket 65 thereon. The support bracket 65 is secured to the bearing section 63 for arcuate movement thereon by means of bearing caps 67 engaged with the upper surface of the bearing surface 63 at spaced portions thereof, which bearing caps receive the ends of a shaft 68 therein. The shaft 68 extends through the cylindrical support member 64 of the support bracket 65 and is engaged therewith by a key 68ª or other means. The support bracket 65 is adapted to journal thereon a tray 69 which has overhanging edge flanges 70 provided on the sides thereof usually extending the length of same. Fig. 6 best shows that one end of the tray 69 that normally is positioned adjacent the end of the frame 11 is of arcuate contour as indicated at 71 while the corresponding surface of the table indicated by the numeral 72 is of arcuate concaved shape so as to receive the end of the tray with a tight fit therebetween but which construction will permit arcuate movement of the tray 69. The tray 69 is ordinarily engaged with the support bracket 65 by means of a split lock washer 73 which can be snapped over a recess formed in a downwardly extending boss 74 formed on the tray 69 and prevent it from being pulled out through the reduced neck 75 of a recess 76 formed in the upper portion of the support bracket 65 in its normal position. Any conventional roller bearing 77 may be associated with the boss 74 and bearings 78 may be positioned intermediate the lower surface of the tray 69 and the upper surface of the support bracket 65 whereby relative arcuate movement between the tray and support bracket 65 is facilitated. Stationary dowels 200 limit the arcuate travel of the tray 69, and a removable dowel 201 secures the tray in a given position for moving the card files, or for moving the bracket 65 to the position for photographing. The dowels 200 and 201, of course, engage with the bracket 65. The tray 69 has a set screw 79 engaged with each of the side flanges 70 abutting the frame 11. These set screws 79 can be tightened so as to secure a page card file thereto, and to prevent the card file and the strips from dropping when the tray 69 is in a vertical position.

So as to control the vertical position of the support bracket 65 and the tray 69, a gear 81 is secured to the shaft 68 at one end thereof, and a pinion gear 82 carried by a shaft 282 that is journaled on the support bracket 65 and has a handle 83 provided therefor. Thus, rotation of the pinion gear 82 by the handle 83 will permit the shaft 68 to be moved through an arc and the tray 69 will be swung to and from a vertical position for facilitating the photographing, photostating or the like of the contents O of the page card file P shown in engagement therewith.

A further modification of the invention is partially shown in Figs. 10 through 12 and in this instance, frame 100 is provided which is adapted to engage with the edges of a page card file 101 which is shown engaged therewith. The page card file 101 is provided with a longitudinally extending rack 102 that extends the length thereof. The rack 102 then is adapted to be engaged with one or more pinion gears 103 and 104 which are associated with the apparatus. The gears 103 and 104 are each supported on shafts 105 and 106, respectively, intermediate the ends thereof. The ends of the shafts 105 and 106 are journaled in eyes 107 that are formed on mounting links 108. The links 108 are slidably positioned by means of tubular guides 109 that are suitably secured to the frame 100 adjacent each side thereof so that the support or mounting links 108 are positioned in the frame for vertical movement. The vertical positions of the shafts 105 and 106 are controlled by means of control shafts 110 and 111 which are positioned in the lower portion of the frame 100. The shafts 110 and 111 carry cams 112 and 113, respectively, which engage with and support the lower ends of the links 108. Hence, as the shafts 110 and 111 are rotated, the cams 112 and 113 are varied so as to change the vertical positions of the gears 103 and 104 and hence whether or not such gears are in driving engagement with the rack formed on the page card file. The shafts 105 and 106 and 110 and 111 can be driven in any suitable manner. The apparatus shown herein for this purpose includes driven shafts 114 and 115 which may be driven in any conventional manner. The shaft 114 carries pulleys 116 and 117 that engage with V-belts 118 that extend to a pulley 119 mounted on each of the shafts 105 and 106. Suitable belts 119ª connect to pulleys 120 that are carried by the shaft 115. The belts 119ª also connect to pulleys 121 carried by each of the shafts 110 and 111.

From the foregoing, it will be seen that the gears 103 and 104 may be driven through the shaft 114 to move the page card file 101 longitudinally through the frame 100 at any desired speed, or to stop such movement of the page card file by disengaging the shafts 114 and 115 from their associated drive means or by disassociating such gears from the rack formed on the page card file. For the purpose of illustration, Fig. 10 shows one of the gears 103 in its engagement position while the corresponding driving gear 104 is disengaged and this may be used as a normal driving arrangement, and by lowering gear 103 and simultaneously raising gear 104, the card files are driven in the opposite directions. In all events, both gears 103 and 104 can be disengaged at one time to permit the use of a constantly driven member for driving the shaft 114 and avoid the necessity of disconnection of such means when the apparatus is in use. The position of the gears 103 and 104 can, of course, be controlled by other means, such as solenoids that control the position of the links 108.

In case it is desired to tilt an entire page card processing unit and take a picture of the entire contents thereof, a modified form of apparatus is shown in Figs. 13 and 14 for such operation. In this instance, a frame 130 is provided and it has an open center at the top section thereof as in the other frames disclosed with slots 131 formed on the opposed surfaces of the spaced side portions of the frame for receipt of a page card file therein so as to permit a controlled longitudinal movement of a page card file through the apparatus. The frame 130 has a depending mounting lug 132 shown formed thereon at the center thereof, although it may be at the end of the frame, and this lug receives in a bore formed therein shaft 133 which protrudes beyond the extremities of the lug 132. The lug 132 has a substantially cylindrical contour at its lowermost surface, as indicated at 134 and this portion of the lug 132 seats on a bearing seat 135 formed in a mounting bracket 136. Bearing caps 137 are secured to the mounting bracket 136 and secure the shaft 133 thereto. The position of the frame 130 is controlled by conventional means which may include a gear 138 that is carried by the shaft 133 at one end thereof and which engages with a driven gear 139 that is connected to the output shaft 140 of a conventional electrical motor 141, or other means, that is secured to the mounting bracket 136. While the remaining portion of the frame 130 is not shown in the drawings, it may comprise an adjustable plow device, belt, etc., as shown in the embodiment of the invention disclosed in Figs. 1 to 4 hereof.

It will be realized that the apparatus of the invention can be used in any desired type of page card file and that the contents of the file comprising transversely extending data-bearing strips can be secured to the page card file in any desired manner when the page card file is to be moved from a horizontal to a vertical position, to facilitate forming a picture of same.

It will also be understood that, in some instances, it will not be necessary to engage the plow frame with both sides of the apparatus of the class described. The frame need only be engaged with one side of the apparatus in some instances. Furthermore, in structures such as that shown in Fig. 5, it may be desirable to form the entire upper section of the page card file positioning frame from a roller which is used to position the file for longitudinal movement. The roller used in positioning the card file would be supported on the main frame from the outer end of such roller member.

While several embodiments of the invention have been disclosed herein, it will be appreciated that modification of these particular embodiments of the invention may be resorted to without departing from the scope of the invention as defined by the appended claims.

Having thus described our invention, what we claim is:

1. Apparatus of the class described wherein a frame having two longitudinally extending side members is provided; said side members having laterally outwardly extending flanges on the outer surfaces thereof, said side members each having a longitudinally extending recess formed in the inner face thereof, said recesses being adapted to have a page card file threaded thereinto and to be supported therebetween for longitudinal movement therethrough, a plow frame for sliding engagement with the top of said frame and for bridging between said side members, substantially Z-shaped members associated with the base portions of said plow frame at the lateral margins thereof to secure said plow frame to the flanges on said side members for sliding engagement with said frame, and a plow carried by said plow frame.

2. Apparatus of the class described wherein a main frame having two longitudinally extending side members is provided; said side members each having a longitudinally extending recess formed in the inner face thereof, said recesses being adapted to have a page card file threaded thereinto and to be supported therebetween for longitudinal movement therethrough, a plow frame for sliding engagement with the top of said main frame and for bridging between said side members, and bracket members associated with the base portions of said plow frame at the lateral margins thereof to secure said plow frame to said side members for sliding engagement with said main frame.

3. Apparatus as in claim 2 wherein ball bearings are associated with said side members and extend into said slots from both surfaces thereof, said ball bearings being located at spaced longitudinal portions of said side members to facilitate passage of a page card file therethrough.

4. In apparatus of the class described, a plow member adapted to be swung into and from engagement with data-bearing strips carried by a page card file, and a plurality of stabilizer fingers extending from said plow member and adapted to overlie a page card file closely when said plow member is engaged therewith to retain data-bearing strips flush against the surface of same.

5. In apparatus of the class described, a frame member, a plow member carried by said frame member and being adapted to be swung into and from engagement with data-bearing strips carried by a page card file positioned in association with said frame member, and a plurality of stabilier fingers extending from said plow member normally to a face thereof spaced from the lower edge thereof, said plow member being adapted to engage with data-bearing cards of a page card file and have said stabilizer fingers closely overlie the cards.

6. In apparatus for positioning a page card file having inwardly turned edge flanges with transversely extending data-bearing cards slidably carried by the page card file and engaged with the edge flanges thereof, said apparatus comprising a frame having a pair of opposed longitudinally extending slots formed in a portion of said frame, said slots being adapted to receive the flanged edges of a page card file and support same for longitudinal movement through the apparatus, a plow frame slidably carried by said frame on the upper surface thereof, a plow device pivotally carried by said plow frame for pivotal movement to and from a point in the plane of said slots, a plurality of positioning fingers engaged with laterally spaced portions of said plow device and extending therefrom for aiding in retaining the data-bearing cards of a page card file flush against the same when said plow device is engaged therewith, and means for positive engagement with a page card file to move it longitudinally of said frame in either direction when engaged with said slots.

7. Apparatus as in claim 2 wherein bearing means are associated with said side members and extend into said recesses from at least the lower surface thereof, said bearings being located at spaced longitudinal portions of said side members to facilitate sliding passage of a page card file therethrough.

8. In apparatus for positioning a page card file having inwardly turned edge flanges with transversely extending data-bearing cards slidably carried by the page card file and engaged with the edge flanges thereof, said apparatus comprising a frame having a pair of opposed longitudinally extending slots formed in said frame in a portion thereof, said slots being adapted to receive the flanged edges of a page card file and support same therebetween for longitudinal movement through the apparatus, a plow frame slidably carried by said frame on the upper surface thereof, a plow device pivotally carried by said plow frame for pivotal movement to and from a point substantially in the plane of said slots for engaging with cards in a page card file, and means for moving a page card file longitudinally of said frame when engaged with said slots.

9. In apparatus as in claim 8, a bracket secured to said frame at one end thereof, a support bracket pivotally secured to said bracket for limited movement in a vertical plane, means for controlling the position of said support bracket on said bracket, a tray having opposed overhanging edge flanges and being adapted to receive a page card file moving from said frame, and means pivotally securing said tray to said support bracket to permit said tray to be positioned as an extension of and normal to said frame at extremities of its movement.

10. In apparatus as in claim 8, a bracket secured to said frame at one end thereof, a support bracket, means pivotally securing said support bracket to said bracket for limited movement in a vertical plane, means for controlling the position of said support bracket on said bracket, a tray having opposed overhanging edge flanges and being adapted to receive a page card file moving from said frame, and means pivotally securing said tray to said support bracket to permit said tray to be positioned in abutment with an end of and normal to said frame at extremities of its movement, the end of said tray adapted to be positioned adjacent said frame being formed on an arc centered on said tray securing means, said end of said frame having a concave contour complemental to said curved tray end.

11. In apparatus for positioning a page card file having inwardly turned edge flanges with transversely extending data-bearing cards slidably carried by the page card file and engaged with the edge flanges thereof, said apparatus comprising a frame having a longitudinally open center portion and a pair of opposed longitudinally extending slots formed in the portion of said frame defining the center portion thereof, said slots being adapted to receive the flanged edges of a page card file and support the file for longitudinal movement through the apparatus, a plow frame slidably carried by said frame above said slots, a plow device pivotally carried by said plow frame for pivotal movement to and from a point substantially in the plane of said slots, means for engagement with a page card file to move it longitudinally of said frame when engaged with said slots on said frame, a bracket carried by said frame and extending longitudinally therebeyond, a support bracket having a support surface and being pivotally carried by said bracket for pivotal movement in a vertical plane from a position where said support surface is horizontal to a position with same vertical, a tray having opposed overhanging edge flanges adapted to receive a page card file therebetween to position same for longitudinal movement, and a pivot member securing said tray to the support surface of said support bracket for pivotal movement thereon so that said tray can be aligned longitudinally with said frame and be positioned normal to the longitudinal axis thereof.

12. In apparatus for positioning a page card file having inwardly turned edge flanges with transversely extending data-bearing cards slidably carried by the page card file and engaged with the edge flanges thereof, said apparatus comprising a frame having a longitudinally open center portion and a pair of opposed longitudinally extending slots formed in the portion of said frame defining the center portion thereof, said slots being adapted to receive the flanged edges of a page card file and support the file for longitudinal movement through the apparatus, a plow frame slidably carried by said frame on the upper surface thereof, a plow device pivotally carried by said plow frame for pivotal movement to and from a point substantially in the plane of said slots, means for positive engagement with a page card file to move it longitudinally of said frame in either direction when engaged with said slots on said frame, said frame having a bracket extending longitudinally therebeyond, a support bracket having a flat support surface and being pivotally carried by said frame bracket for pivotal movement in a vertical plane from a position with said support surface being horizontal to a position with same vertical, a tray having opposed overhanging edge flanges adapted to receive a page card file therebetween and engage therewith, a pivot member securing said tray to the support surface of said support bracket for pivotal movement thereon so that said tray can be aligned longitudinally with said frame and be positioned normal to the longitudinal axis thereof, and bearing means associated with said tray for pivotally supporting same.

13. In apparatus for processing page card files and their contents, a frame adapted to engage with the marginal side edges of a page card file, a page card file, a rack carried by said page card file on the lower surface thereof, a pinion gear engaged with said rack, a shaft positioning said pinion gear, a pair of support links journaling said shaft therein on opposite sides of said gear, tubular guides carried by said frame and slidably positioning said links therein for vertical movement, a control shaft journaled in said frame, a pair of cams carried by said control shaft, the lower ends of said links being supported by said cams for controlling the vertical position of said shaft and the engagement of said pinion with said rack, and means for rotating said control shaft.

14. In apparatus for processing page card files and their contents, a frame adapted to engage with the marginal side edges of a page card file, a page card file, a rack carried by said page card file on the lower surface thereof, a pinion gear engaged with said rack, a shaft positioning said pinion gear, a support member journaling said shaft therein, a tubular guide carried by said frame and slidably positioning said link therein, a control shaft journaled in said frame, a cam carried by said control shaft, said link being engaged with said cam for controlling the vertical position of said shaft and the engagement of said pinion with said rack, and means for moving said control shaft through an arc.

15. In apparatus for positioning a page card file having inwardly turned edge flanges with transversely extending data-bearing cards slidably carried by the page card file in engagement with the edge flanges thereof and having means on the under surface thereof for engaging motivating means, said apparatus comprising a main frame having a pair of opposed longitudinally extending slots formed therein, said slots being adapted to receive the flanged edges of a page card file and support the file for longitudinal movement through the apparatus, a plow frame carried by said main frame above said slots, a plow device pivotally carried by said plow frame for pivotal movement to and from a point substantially in the plane of said slots, means carried by said main frame for engagement with a page card file to move it longitudinally of said main frame when such file is engaged with said slots on said main frame, and driving means for said means.

16. Apparatus as in claim 15 wherein a mounting bracket is provided for said main frame, said main frame is provided with a dependent mounting lug, a shaft is associated with said lug and journaled on said mounting bracket to support said main frame for arcuate movement in a vertical plane, said lug and said bracket having complementary surfaces formed thereon for limiting said main frame to movement through an arc of about 90° from a horizontal to a vertical position, and means for effecting arcuate movement of said main frame.

17. In apparatus for positioning a page card file having inwardly turned edge flanges with transversely extending data-bearing cards slidably carried by the page card file in engagement with the edge flanges thereof and having means on the under surface thereof for engaging motivating means, said apparatus comprising a frame having one section with a longitudinally open center portion and a pair of opposed longitudinally extending devices associated with the center portion thereof, said devices being adapted to engage with the edges of a page card file and support the file for longitudinal movement through the apparatus, a plow frame slidably carried by said frame above said devices, a plow device pivotally carried by said plow frame for pivotal movement to and from a point substantially in the plane of said devices, means for engagement with a page card file to move it longitudinally of said frame when such file is engaged with said devices on said frame, and driving means for said means.

18. In apparatus for processing page card files and their contents, a frame adapted to engage with the marginal side edges of a page card file, a page card file, a rack carried by said page card file on the lower surface thereof, a pinion gear engaged with said rack, a shaft positioning said pinion gear, means for driving said shaft, and means for raising and lowering said shaft to control the engagement of said pinion gear with said rack.

19. In apparatus for positioning a page card file, a frame adapted to engage with the marginal side edges of a page card file to position same therein for longitudinal sliding movement in a fixed path, a tray adapted to engage with the marginal side edges of a page card file and to receive same from said frame, said tray defining a plane, support means for said tray, and means pivotally securing said tray to said support means for arcuate movement in the plane of said tray.

20. In apparatus for positioning a page card file having inwardly turned edge flanges with transversely extending data-bearing cards slidably carried by the page card file and engaged with the edge flanges thereof, said apparatus comprising a frame having a pair of opposed longitudinally extending slots formed in said frame in a portion thereof, said slots being adapted to receive the flanged edges of a page card file and suport same therebetween for longitudinal movement through the apparatus, a plow frame slidably carried by said frame and movable at least substantially the length thereof, and a plow device pivotally carried by said plow frame for pivotal movement to and from a point substantially in the plane of said slots for engaging with cards in a page card file.

21. In apparatus for positioning a page card file having inwardly turned edge flanges with transversely extending data-bearing cards slidably carried by the page card file and engaged with the edge flanges thereof, said apparatus comprising a main frame having a pair of opposed longitudinally extending slots formed in said main frame in a portion thereof, said slots being adapted to receive the flanged edges of a page card file and support same therebetween for longitudinal movement through the apparatus, a plow frame slidably carried by said main frame and movable at least substantially the length thereof, a plow device pivotally carried by said plow frame for pivotal movement to and from a point substantially in the plane of said slots for engaging with cards in a page file, and means for preventing relative movement at desired times between said main frame and a page card file engaged therewith.

22. In apparatus as in claim 19, positioning means for said support means adapted to support it for movement in a plane lying normally to the plane of said tray.

23. In apparatus for positioning a page card file, a frame adapted to engage with the marginal side edges of a page card file to position same therein for longitudinal sliding movement in a fixed path, a tray adapted to engage with the marginal side edges of a page card file and to receive same from said frame, and support means for said tray, said tray being movable with relation to said frame.

24. Apparatus as in claim 2, wherein a mounting lug is provided for said main frame, and means engage said lug to position said main frame for arcuate movement in a vertical plane about an axis extending transversely of said main frame.

HENRY H. FELDSTEIN.
MARC J. FELDSTEIN.

REFERENCES CITED

The following references are of record in the file of this patent:

UNITED STATES PATENTS

| Number | Name | Date |
| --- | --- | --- |
| 1,574,931 | Powell | Mar. 2, 1926 |
| 1,970,381 | Landrock | Aug. 14, 1934 |